United States Patent [19]
Hoover

[11] Patent Number: 5,143,206
[45] Date of Patent: Sep. 1, 1992

[54] ROD CONVEYOR SWITCH

[75] Inventor: Don R. Hoover, Milford, Ind.

[73] Assignee: CTB, Inc., Milford, Ind.

[21] Appl. No.: 713,458

[22] Filed: Jun. 11, 1991

[51] Int. Cl.⁵ .................................. B65G 15/00
[52] U.S. Cl. .................................. 198/810
[58] Field of Search .................. 198/810, 813, 502.1

[56] References Cited

U.S. PATENT DOCUMENTS

| | | | |
|---|---|---|---|
| 2,438,068 | 3/1948 | Mercier | 198/813 |
| 2,907,450 | 10/1959 | Reid | 198/810 |
| 2,932,382 | 4/1960 | James | 198/810 |
| 3,262,553 | 7/1966 | Johnson | 198/810 X |
| 3,963,115 | 6/1976 | Teske et al. | 198/810 X |
| 4,564,099 | 1/1986 | Uozumi | 198/810 X |

FOREIGN PATENT DOCUMENTS 1456344  2/1989  U.S.S.R. .............................. 198/813

Primary Examiner—Robert P. Olszewski
Assistant Examiner—Cheryl L. Gastineau
Attorney, Agent, or Firm—Trexler, Bushnell, Giangiorgi & Blackstone, Ltd.

[57] ABSTRACT

A switch assembly for selectively controlling the operation of a conveyor apparatus in response to exceeding a predetermined range of limits of operation. The switch assembly includes a conveyor belt sensing device for sensing displacement of a conveyor belt of the conveyor apparatus and a switch device operatively coupled with the conveyor belt sensing device for responding to the predetermined conditions.

8 Claims, 2 Drawing Sheets

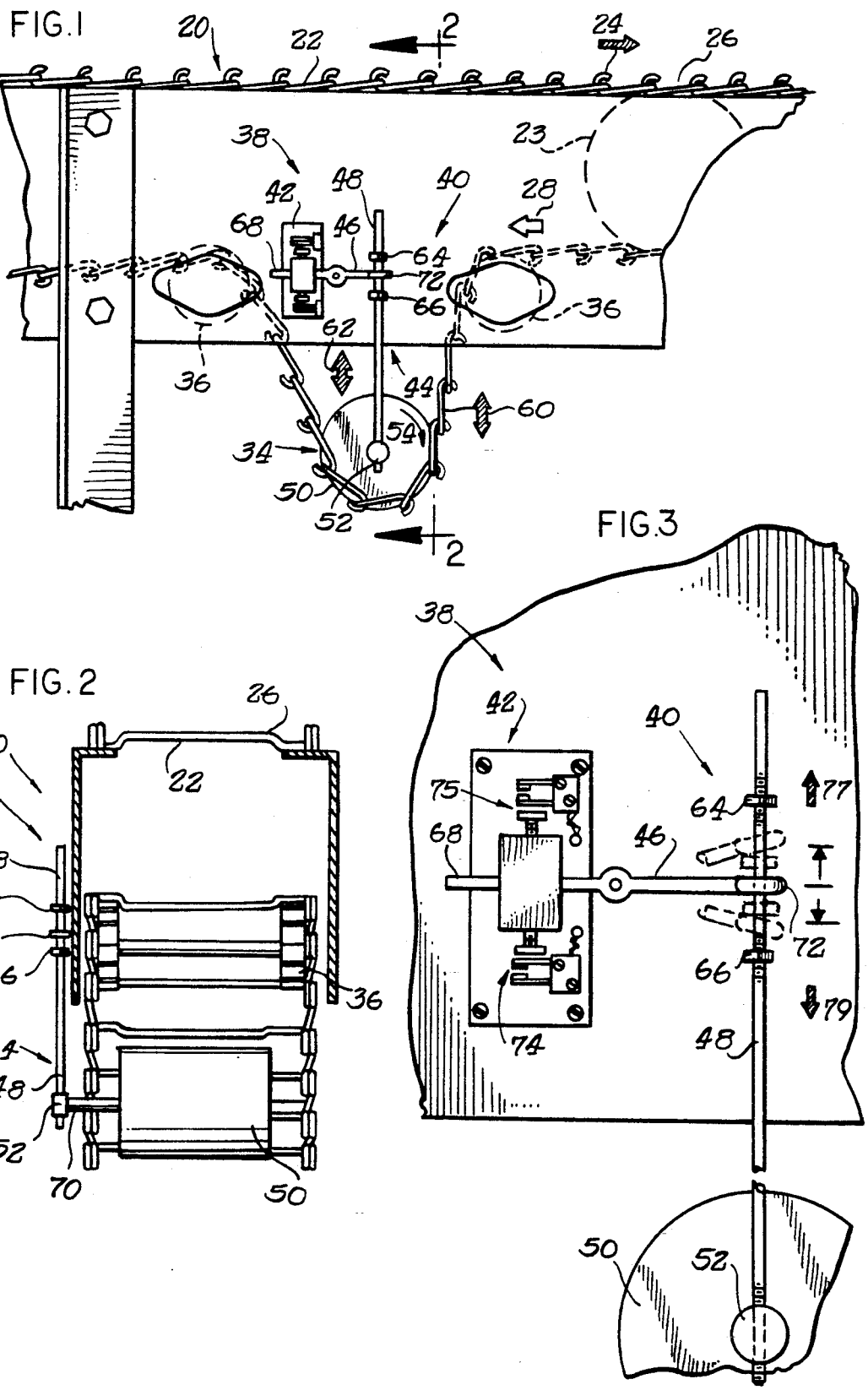

ROD CONVEYOR SWITCH

BACKGROUND OF THE INVENTION

This invention relates to a switch assembly for a conveyor apparatus to prevent undesired movement of the conveyor apparatus and to regulate the slack or tension in the conveyor belt.

Conveyors are utilized in many process operations to automate and expedite the transportation and handling of materials. Typically, a conveyor includes a conveyor belt driven by some form of drive apparatus and including some form of tension take up loop or slack loop permitting the installation and adjustment of the conveyor belt.

It is not uncommon for a mechanical difficulty with the conveyor apparatus to stop movement of the conveyor belt or in making the belt slack or tensioned. In such a situation it is desirable to momentarily or completely cease operation of the conveyor apparatus until the problem is rectified. Also, conveyor belts are naturally slightly displaced upon the addition or removal of weight to the system as well as by insignificant blocking such as is caused by poor lubrication or insignificant material blockage. However, a simple and effective device to sense and the operation of a conveyor apparatus which accommodates slight natural displacement has not been forthcoming.

Such a switch assembly would be extremely important for preventing injury to employees and materials transported on the conveyor belt. It would be desirable to provide a switch which would terminate operation of the conveyor apparatus should a limb or an article of clothing of an unfortunate person become entangled therein or upon adding or removing a burdensome load from the conveyor belt. Such a switch could provide a hands-free, fail safe safety mechanism necessary to prevent injury and material damage.

In a similar manner such a switch could prevent unnecessary damage to the conveyor apparatus and the materials being transported by terminating operation of the apparatus before excessive resistance or inappropriate operation takes its toll.

Further, it is desirable to provide a conveyor apparatus which can take up the slack in a conveyor belt on the fly. Presently available conveyor apparatus tend to have a problem with maintaining consistent movement of the conveyor belt. Such operation is very important, especially in the movement of fragile items including eggs or the like.

Since it is desirable to sense and respond to conveyor apparatus malfunctions or undesirable changes in operation and simple and efficient sensing devices are not available, it is desirable to provide a sensing device to overcome such problems. It is desirable to provide a switch assembly which will allow for a degree of movement of the conveyor belt so that the conveyor apparatus is not turned off at the slightest displacement of the conveyor belt. Further, the conveyor belt may experience deviations in either speeding up or slowing down and it is therefore desirable to provide a switch assembly capable of sensing both types of deviations.

OBJECTS AND SUMMARY OF THE INVENTION

A general object of the present invention is to provide a switch assembly which is capable of sensing undesirable displacement of a conveyor belt of a conveyor apparatus and to appropriately respond to such displacement.

Another object of the present invention is to provide a switch assembly which accommodates a predetermined range of limits of acceptable displacement under predetermined conditions to compensate for natural or minor displacements which may occur in a conveyor apparatus such as is caused by lack of lubrication, insignificant foreign material or addition or removal of articles to the apparatus.

Yet a further object of the present invention is to provide a switch assembly for a conveyor apparatus which is attached to a slack loop in the conveyor belt to sense the displacement in the slack loop to determine the displacement of the conveyor belt.

Still another object of the present invention is to provide a plurality of switch assemblies associated with a conveyor apparatus to selectively control the operation of a conveyor belt in order to maintain consistent movement of the conveyor belt.

Briefly, and in accordance with the foregoing, the present invention comprises at least one switch assembly for selectively controlling the operation of a conveyor apparatus in response to a predetermined range of limits of acceptable operation. The switch assembly includes a conveyor belt sensing device for sensing displacement of the conveyor belt and a switch device operatively coupled with the conveyor belt sensing device for responding to the predetermined conditions.

BRIEF DESCRIPTION OF THE DRAWINGS

The features of the present invention which are believed to be novel are set forth in the appended claims. The organization and manner of the operation of the invention, together with the further objects and advantages thereof, may be understood best by reference to the following description taken in connection with the accompanying drawings wherein like reference numerals identify like elements in which:

FIG. 1 is an enlarged side view of a slack loop portion of a conveyor apparatus in which a switch assembly of the present invention is employed;

FIG. 2 is a cross-sectional view of the slack loop portion of the conveyor apparatus taken along line 2—2 in FIG. 1;

FIG. 3 is an enlarged view of the switch assembly of the present invention; and

DESCRIPTION OF THE ILLUSTRATED EMBODIMENT

Figure 4:
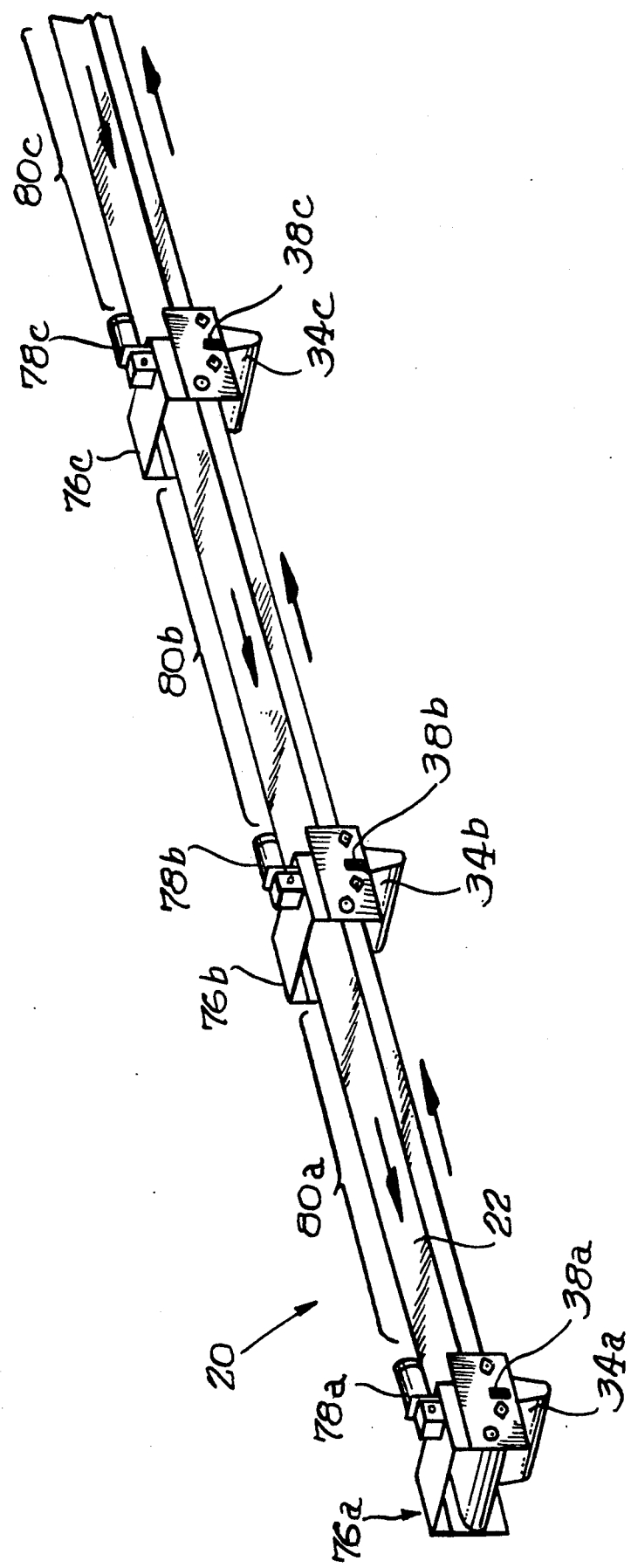
FIG. 4 is a perspective view of a plurality of switches associated with the conveyor apparatus to selectively control the conveyor apparatus in order to maintain consistent movement of a conveyor belt.

While this invention may be susceptible to embodiments in different forms, there is shown in the drawings and will be described herein in detail, a specific embodiment with the understanding that the present disclosure is to be considered an exemplification of the principles of the invention and is not intended to limit the invention to that as illustrated.

FIG. 1 provides an illustration of a portion of a conveyor apparatus 20 which moves a conveyor belt 22 through a looped path. As shown, the looped path travels to the right (as indicated by arrow 24) on a top portion 26 of the conveyor belt 22 and consequently travels to the left (as indicated by arrow 28) on a bottom portion 30 of the conveyor belt 22. A sprocket 23 drives the conveyor belt by engaging both the top portion 26 and the bottom portion 30. The conveyor belt 22 shown in FIG. 1 is comprised of a multiplicity of interengaging rod loops or links 32.

A slack portion 34 is provided in the conveyor belt 22 to take up a predetermined length of slack and to permit simplified removal of the conveyor belt 22 upon releasing the slack retained in the slack portion 34. The slack portion 34 is essentially a looped portion of the conveyor belt 22 which is weightedly retained between two axles 36,36. A switch assembly 38 is positioned relative to the slack portion 34 in order to utilize displacement of the slack portion 34 to sense displacement of the conveyor belt 22.

The switch assembly 38 includes conveyor belt sensing means 40 and switch means 42. The conveyor belt sensing means 40 includes a displacement assembly 44 operatively engaged with the switch means 42 by a connecting member 46. A vertical member 48 is operatively attached to a weighted member 50 which is positioned in the slack portion 34 for retaining a desired tension in the conveyor belt 22. The vertical member 48 is attached to a hub 52 which is coaxial with the center of the weighted member 50 and thus permits the vertical member 48 to remain in a generally vertical position as the weighted member 50 rotates (as indicated by arrow 54) under the influence of the movement 24, 28 of the conveyor belt 22.

A displacement (as indicated by arrow 60) in the conveyor belt 22 results in a corresponding displacement (as indicated by arrow 62) in the vertical member 48. Upper and lower limit members 64, 66 are adjustably attached to the vertical member 48. The connecting member 46 movably attaches to the vertical member 48 between the upper and lower limit members 64, 66. An end 68 of the connecting member 46 distal the vertical member 48 operatively engages the switch means 42.

Displacement of the conveyor belt 22 is transmitted through the displacement assembly 44 to the connecting member 46 and thus to the switch means 42. The adjustable placement of the upper and lower limit members 64, 66 provides a range of displacements of the conveyor belt 22 which do not activate the switch means 42. However, when either the upper or lower limit member 64, 66 contacts the connecting member 46 attached therebetween the connecting member 46 is moved thereby communicating a response condition to the switch means 42 to respond as appropriate under the circumstances.

FIG. 2 provides a cross-sectional view of the conveyor apparatus 20 taken along line 2—2 in FIG. 1. The cross-sectional view shows the displacement assembly 44 in a side view. The vertical member 48 extends upwardly from the hub 52 attached to the weighted member 50 by a shaft 70. The connecting member 46 has a ring portion 72 which engages the vertical member 48 between the upper and lower limit members 64, 66.

As better shown in the enlarged view of the switch assembly 38 as illustrated in FIG. 3, when the vertical member 48 is sufficiently displaced one of the limit members 64, 66 contacts the ring portion 72 of the connecting member 46 and urges the connecting member 46 upwardly or downwardly. Vertical displacement of the connecting member 46 activates the switch means 42. When activated, the switch means energizes a corresponding electrical switch 74, 75 providing a control signal to carry out an appropriate response. More specifically, upward displacement (as indicated in phantom line and by arrow 77) activates switch 74 and downward displacement (as indicated in phantom and by arrow 79) activates switch 75. Once one of the switches 74, 75 has been activated the conveyor apparatus responds by terminating the operation of the conveyor apparatus 20, reducing the conveyor belt speed, or terminating operation of the conveyor apparatus for a prespecified period of time.

More specifically, switch 74 is activated when the slack portion 34 becomes shorter and switch 75 is activated when the slack potion 34 becomes longer. The slack portion 34 lengthens when the top portion of the conveyor belt becomes obstructed or is slowed. The slack portion 34 lengthens when the bottom portion of the conveyor belt becomes obstructed or is slowed. When switch 74 is activated the conveyor belt is stopped for a predeterimined period of time or slowed as described hereinbelow. When switch 75 is activated operation of the conveyor belt is terminated.

As shown in FIG. 4, the conveyor belt 22 is presented in a simplified representation in that each link of the conveyor has not been shown. In this view of the conveyor apparatus 20, the switch 38 is enclosed to protect the switch assembly 38 from accidental interference. Additionally, the conveyor apparatus 20 is viewed from the right side which is a mirror image of the left side as illustrated in FIG. 1-3.

A series of driver units 76 are shown in FIG. 4 and are referred to as driver units 76a, 76b and 76c. Each driver unit 76a-c and the respective corresponding components are referred to by an identifying reference numeral identifying like parts as referred to in FIGS. 1-3 and a suffix refers to each driver unit 76 a-c. For example, suffix "a" represents the first driver unit 76a, suffix "b" represents the second driver unit 76b and suffix "c" represents the third driver unit 76c. Additional driver units may be included or added and may be placed along the conveyor belt 22 in series as generally shown in FIG. 4 as determined by the design of the conveyor apparatus 20.

Referring to FIG. 4, the first driver unit 76a includes a driver motor 78a which provides a driving force to a portion of the continuous conveyor belt 80a between the first driver unit 76a and the second driver unit 76b. Likewise, a drive motor 78b of the second driver unit 76a provides a driving force to a portion of the continuous conveyor belt 80b between the second driver units 76b and the third driver unit 76c. Drive unit 76a includes a switch assembly 38a which selectively controls the operation of drive motor 78b depending upon the condition of the slack portion 34a.

For example, in operation, the conveyor belt 22 is driven through the driver units 76a-c. Each drive motor 78a-c assists in driving a corresponding portion of the conveyor belt 80a-c. When the conditions in the slack portion 34a indicate to switch assembly 38a that driver unit 76b is getting ahead, switch assembly 38a selectively controls motor 78b to allow the slack portion 34a to return to a condition at which switch drive motor 78b resumes its original operating mode.

With additional reference to FIG. 1 and 2, the switch means 42 of the present invention may be configured so that when the slack portion 34a lengthens all of the driver units 76a-c are turned off and when the slack portion 34a shortens the driver units 76a-c are slowed or momentarily turned off. For example, when the slack portion 34a lengthens, the weighted member 50 and the attached vertical member 48 move downwardly thereby moving the connecting member 46 downwardly and activating the top switch 75. When the slack portion 34a is shortened the weighted member 50 and the attached vertical member 48 move upwardly thereby moving the connecting member 46 upwardly and activating the bottom switch 74. Top switch 75 is preset to terminate operation of the entire conveyor belt 22 and bottom switch 74 is preset to momentarily terminate driver motor 78b or synchronously slow the entire conveyor belt 22.

In use, a functioning conveyor apparatus 20 has a conveyor belt 22 moving in a predetermined path 24, 28. A slack portion 34 is provided in the conveyor belt 22 and the conveyor belt 22 is tensioned by a weighted member 50 positioned within the slack portion 34. A switch assembly 38 is provided to respond to predetermined conditions in a predetermined fashion.

The switch assembly 38 includes a displacement assembly 44 and switch means 42. Under normal operating conditions the displacement assembly 44 is vertically displaced 62 in response to proportional displacement 60 of the conveyor belt 22. The range of acceptable vertical displacement 62 of the displacement assembly 44 is limited by upper and lower limit members 64, 66. When the displacement assembly 44 is displaced beyond the range of the upper and lower limit members 64, 66 the connecting member 46 operatively attached to the vertical member 48 is displaced and activates the switch means 42.

When activated, the switch means 42 energizes an electrical switch 74, 75 which indicates that the range has been breached and that an appropriate action should be taken. Such appropriate actions include, but are not limited to; termination of the operation of the conveyor belt 22 to permit removal of the obstruction or repair of the condition which caused the conveyor belt 22 to be displaced beyond acceptable limits, momentarily stopping the corresponding drive unit 76, or adjusting the speed of the corresponding drive unit 76.

While a preferred embodiment of the present invention is shown and described, it is envisioned that those skilled in the art may devise modifications of the present invention without departing from the spirit and scope of the appended claims.

The invention is claimed as follows:

1. A switch assembly for terminating the operation of a conveyor apparatus, said conveyor apparatus including a conveyor belt, said switch assembly comprising: conveyor belt sensing means for sensing displacement of said conveyor belt and switch means operatively coupled with said conveyor belt sensing means for responding to predetermined conditions sensed by said conveyor belt sensing means; said conveyor belt sensing means including a displacement assembly movably engaged with said conveyor apparatus for detecting displacement of said conveyor belt and a connecting member operatively attached to said displacement assembly for transmitting displacement of said displacement assembly to said switch means; wherein said displacement assembly includes a weighted member positioned on said conveyor belt for removing slack therefrom, a generally vertical member operatively attached to said weighted member, upper and lower limit members adjustably attached to said vertical member for defining a range of movement of said displacement assembly.

2. A switch assembly according to claim 1, wherein said connecting member is operatively attached to said vertical member between said upper and lower limit members, said lower limit member contacting and downwardly moving said connecting member when said displacement assembly is displaced downwardly and said upper limit member contacting and upwardly moving said connecting member when said displacement assembly is displaced upwardly.

3. A switch assembly according to claim 1, wherein said switch means is an electrical switch which selectively controls operation of said conveyor apparatus in response to displacement of said connecting member by said displacement assembly when displacement thereof exceeds a range of predetermined limits.

4. A switch assembly for a conveyor apparatus, said conveyor apparatus including a conveyor belt having a slack portion formed therein for permitting a degree of play in said conveyor belt, said switch assembly comprising conveyor belt sensing means for sensing displacement of said conveyor belt and switch means operatively coupled with said conveyor belt sensing means for responding to a predetermined range of displacement limits; said conveyor belt sensing means including a displacement assembly being operatively engaged with said slack portion of said conveyor belt for detecting displacement of said slack portion and a connecting member operatively engaged with said displacement assembly for transmitting displacement of said slack portion beyond a predetermined range of limits; said switch means including a connecting member engaging portion for translating movement of said connecting member and switch contacts engaged by said engaging portion when displacement of said conveyor belt exceeds a predetermined range of displacement limits; said displacement assembly includes a weighted body positioned in said slack portion of said conveyor belt, a vertical member attached to said weighted body for translating displacement of said conveyor belt into generally vertical movement, and two limit members adjustably attached to said vertical member at a predetermined upper and lower limit defining a predetermined range of movement of said displacement assembly.

5. A switch assembly according to claim 4, wherein said connecting member is operatively attached to said vertical member between said limit members, one of said limit members contacting and moving said connecting member when displacement of said conveyor exceeds a predetermined range, movement of said connecting member activating said switch means for selectively controlling said conveyor apparatus.

6. A plurality of switch assemblies associated with a conveyor apparatus having a conveyor belt, said plurality of switch assemblies selectively controlling the operation of at least a segment of said conveyor belt, each of said plurality of switch assemblies comprising conveyor belt sensing means for sensing displacement of said conveyor belt and switch means operatively coupled with said conveyor belt sensing means; said conveyor belt sensing means including a displacement assembly associated with said conveyor apparatus for detecting displacement of said conveyor belt and a connecting member attached to said displacement assembly for transmitting displacement of said displacement assembly to said switch means; said plurality of switch assemblies being spaced apart along said conveyor belt, a driver motor being associated with each of said plurality of switch assemblies, a first switch assembly positioned downstream from a second switch, said first switch selectively controlling a second driver motor associated with said second switch assembly for controlling the speed of movement of a segment of conveyor belt between said first switch assembly and said second switch assembly.

7. A plurality of switch assemblies according to claim 6 wherein said displacement assembly comprises a weighted member positioned on said conveyor belt for removing slack therefrom, a generally vertical member operatively attached to said weighted member, upper and lower limit members adjustably attached to said vertical member for defining a range of movement of said displacement assembly; said connecting member being operatively attached to said vertical member between said upper and lower limit members, said lower limit member contacting and downwardly moving said connecting member when said displacement assembly is displaced downwardly and said upper limit member contacting and upwardly moving said connecting member when said displacement assembly is displaced upwardly.

8. A plurality of switch assemblies according to claim 6 wherein said second switch assembly is positioned downstream from a third switch for selectively controlling the operation of a third drive motor at said third switch until said second switch senses a predetermined condition in said conveyor, said second driver motor continuing operation until said second switch senses said predetermined condition for continuing operation of said third drive motor.

* * * * *